(12) United States Patent
Kang et al.

(10) Patent No.: US 7,594,365 B2
(45) Date of Patent: Sep. 29, 2009

(54) HEATING FLOOR SYSTEM

(75) Inventors: Se-Chang Kang, Cheongju-si (KR); Dong-Sik Jang, Busan (KR); Myong Lee, Cheongju-si (KR); Seung-Min Jeon, Cheongju-si (KR); Sung-Seock Hwang, Cheongju-si (KR); Seong-Chan Park, Cheongju-si (KR)

(73) Assignee: LG Chem, Ltd. (KR)

( * ) Notice: Subject to any disclaimer, the term of this patent is extended or adjusted under 35 U.S.C. 154(b) by 231 days.

(21) Appl. No.: 11/520,239

(22) Filed: Sep. 13, 2006

(65) Prior Publication Data

US 2007/0056233 A1    Mar. 15, 2007

(30) Foreign Application Priority Data

Sep. 15, 2005  (KR) ............... 10-2005-0086187

(51) Int. Cl.
*E04C 2/52*    (2006.01)
(52) U.S. Cl. .............. 52/220.2; 52/241; 52/143; 52/263; 52/126.6; 181/286; 181/290; 181/293; 131/168
(58) Field of Classification Search .......... 52/241, 52/143, 144, 126.6, 220.2; 96/14; 131/168; 181/286, 290, 293
See application file for complete search history.

(56) References Cited

U.S. PATENT DOCUMENTS

| | | | | |
|---|---|---|---|---|
| 2,184,139 A | * | 12/1939 | Cunnington | 428/152 |
| 3,524,825 A | * | 8/1970 | Rill, Jr. | 521/131 |
| 3,735,794 A | * | 5/1973 | Lebowitz | 160/135 |
| 3,919,785 A | * | 11/1975 | Generaux | 434/96 |
| 4,062,546 A | * | 12/1977 | McIntyre | 273/281 |
| 4,508,162 A | * | 4/1985 | Radtke | 165/56 |
| 4,625,710 A | * | 12/1986 | Harada et al. | 126/619 |
| 4,723,881 A | * | 2/1988 | Duran | 411/353 |
| 4,736,555 A | * | 4/1988 | Nagare et al. | 52/126.6 |
| 4,948,314 A | * | 8/1990 | Kurosaki | 411/182 |
| 5,030,051 A | * | 7/1991 | Kaneko et al. | 411/55 |
| 5,031,369 A | * | 7/1991 | Kobayashi et al. | 52/126.6 |
| 5,078,203 A | * | 1/1992 | Shiroki | 165/56 |
| 5,362,931 A | * | 11/1994 | Fries | 181/284 |
| 5,487,534 A | * | 1/1996 | Sakamoto et al. | 267/141.1 |
| 5,497,826 A | * | 3/1996 | Ingram | 165/56 |
| 5,501,754 A | * | 3/1996 | Hiraguri | 156/71 |
| 5,665,943 A | * | 9/1997 | D'Antonio | 181/295 |
| 5,992,108 A | * | 11/1999 | Falcey | 52/220.2 |
| 6,270,016 B1 | * | 8/2001 | Fiedrich | 237/69 |
| 6,336,296 B1 | * | 1/2002 | Ishibashi et al. | 52/220.2 |
| 6,378,672 B1 | * | 4/2002 | Wakui | 188/378 |

(Continued)

FOREIGN PATENT DOCUMENTS

JP    05-239904    9/1993

(Continued)

*Primary Examiner*—Richard E Chilcot, Jr.
*Assistant Examiner*—Joshua Ihezie
(74) *Attorney, Agent, or Firm*—Cantor Colburn LLP

(57) ABSTRACT

Disclosed herein is a floor sound-insulating type heating system in which a floor sound-insulating structure for reducing the transmission of an impact sound from upstairs to downstairs in an apartment complex and a dry floor heating structure are integrally formed with each other. The floor sound-insulating type heating system can achieve improvements in construction efficiency as well as sound insulation and heat insulation effects.

13 Claims, 4 Drawing Sheets

U.S. PATENT DOCUMENTS

| | | | |
|---|---|---|---|
| 6,951,264 B2 * | 10/2005 | Byma et al. | 181/286 |
| 2002/0175023 A1 * | 11/2002 | Wilson | 181/293 |
| 2002/0190572 A1 * | 12/2002 | Nakazawa | 303/116.4 |
| 2004/0219857 A1 * | 11/2004 | Fujishiro et al. | 445/23 |
| 2006/0118355 A1 * | 6/2006 | Blomeling et al. | 181/286 |

FOREIGN PATENT DOCUMENTS

| | | | |
|---|---|---|---|
| JP | 06010492 A | * | 1/1994 |
| JP | 09-144289 | | 6/1997 |
| JP | 2000109540 A | * | 4/2000 |
| JP | 2001170957 A | * | 6/2001 |

* cited by examiner

HEATING FLOOR SYSTEM

This application claims the benefit of the filing date of Korean Patent Application No. 10-2005-0086187 filed on Sep. 15, 2005 in the Korean Intellectual Property Office, the disclosure of which is incorporated herein in its entirety by reference.

TECHNICAL FIELD

The present invention relates to a floor sound-insulating type heating system.

BACKGROUND ART

Generally, houses provide an environment appropriate for human life, to serve as dwelling units for human beings. For this, the houses are provided with cooling/heating systems.

A representative form of a dwelling in modem society is an apartment complex having a multi-floor structure in which a plurality of dwelling units are stacked in a vertical direction. Since the apartment complex has the particularity in that neighboring dwelling units jointly own floors and walls dividing them, the apartment complex has a necessity for a sound-insulating system capable of preventing transmission of noise between the dwelling sites, in addition to having cooling/heating systems.

A floor heating system should be designed to achieve a rapid room heating with low fuel costs and to have a high heat accumulation capacity for maintaining a heated state for a long time without addition of fuel.

The floor heating system is generally constructed by a wet construction method in which heat radiators are directly buried in concrete slabs by use of a mortar and a dry construction method in which a heat insulating material is disposed on concrete slabs and in turn, heat radiators are mounted to the heat insulating material.

Floor systems having the above heating system may take the form of a conventional floor system in which the heating system is directly constructed in concrete slabs, or a floating floor system in which the heating system is spaced apart upward from concrete slabs. The floating floor system is also called a double floor structure.

Giving a definition of a floor impact sound in association with the apartment complex, it is a noise being transmitted through floors between dwelling units. The floor impact sound has to be reduced as much as possible, and it has been found that the floating floor system is more advantageous to reduce the floor impact sound than the conventional floor system.

Conventionally, a floor sound-insulating system for reducing the transmission of an impact sound from upstairs to downstairs of the apartment complex has been separately constructed from a dry heating system for heating a floor. However, this has problems of disadvantageously increasing the thickness of the entire floor heating system and reducing floor-to-floor spans.

Further, since the dry floor heating system has to be constructed after completing construction of the floor sound-insulating system, there are problems of an excessive increase in construction costs and time. Furthermore, the increased thickness of the entire floor heating system increases the weight of the system, resulting in deterioration in safety of the entire building.

Japanese Patent Laid-open Publication No. 1997-0144289 discloses a double floor using a panel, which is formed at an upper surface thereof with lattice-shaped grooves and at side surfaces thereof with incisions. The disclosed invention proposes a cable extraction method for extracting cables from a lower space through the incisions to install the cables in the grooves. As will be appreciated, the double floor of the disclosed invention has no relation with the present invention dealing with floor sound insulation and heat insulation.

Japanese Patent Laid-open Publication No. 1993-0239904 discloses a double floor in which electric heating wires are installed in grooves formed at an upper surface of a panel. It will be also appreciated that the disclosed invention also has no relation with the present invention dealing with floor sound-insulation and heat-insulation.

DISCLOSURE

Technical Problem

Therefore, the present invention has been made in view of the above problems, and it is an object of the present invention to provide a floor sound-insulating type heating system in which a floor sound-insulating structure for reducing the transmission of an impact sound from upstairs to downstairs in an apartment complex and a dry floor heating structure are integrally formed with each other, thereby achieving an improvement in construction efficiency as well as sound insulation and heat insulation effects.

Technical Solution

In accordance with an aspect of the present invention, the above and other objects can be accomplished by the provision of a floor sound-insulating type heating system comprising: a panel installed on a slab floor surface and having a concavo-convex portion formed at a lower surface thereof and pipe grooves formed at an upper surface thereof; and a heat-insulating member having a concavo-convex portion formed at an upper surface thereof, wherein the panel and the heat-insulating member are concavo-convex coupled to each other by engagement of their corresponding concavo-convex portions.

With the coupling of the panel and the heat-insulating member according to the present invention, construction efficiency as well as sound insulation and heat insulation effects can be maximized.

Differently from a conventional floor sound-insulating system that requires an excessively long time to assemble respective constituent elements thereof, according to the present invention, functions of the respective constituent elements are integrated in a single structure by virtue of the concavo-convex coupling structure. As a result, the resulting coupling structure can be constructed via a single operation, resulting in a reduction in construction time.

Further, the conventional floor sound-insulating system has a problem in that it uses a material having a high specific gravity, such as an inorganic board, etc., as a supporting structure for daily life load to be applied thereon and thus, has a difficulty in handling thereof. However, the concavo-convex coupling structure of the present invention can efficiently support the expected daily life load to be applied thereon while achieving a relatively reduced weight as a result of being made of a plastic material. Accordingly, the floor sound-insulating type heating system of the present invention guarantees easy handling, cutting and processing as well as improved construction efficiency, and can increase the safety of a building, in particular, in the case of earthquakes, etc. because it has the effect of reducing the weight of the building.

According to the present invention, the inorganic board of the conventional floor sound-insulating system and heat-insulating members essentially provided on an upper or lower surface of the inorganic board are replaced by the concavo-convex coupling structure, and this has the effect of achieving a slimmer floor thickness. Also, on the basis of a distance between prop members, a hardness and structure of vibration-proof members secured to the bottom of the respective prop members, and a coupling method with a slab therebelow, the floor sound-insulating type heating system of the present invention can achieve differentiated sound insulation effect. Thereby, the present invention can improve construction efficiency and safety of a building while being capable of employing the principle of a conventional dry double floor structure.

Preferably, the panel may comprise the prop members formed at corner portions thereof to extend downward from the lower surface thereof. This allows the panel to come into contact, only at regions of the prop members, with a slab floor surface, thereby achieving an increase in sound insulation effect by virtue of a reduced contact area.

Preferably, the heat-insulating member may be inserted underneath the panel, and a space is defined between the heat-insulating member and the slab floor surface. The space provides a double floor structure advantageous to reduce a floor impact sound.

Preferably, a thermo-material may be mounted in the space, to increase heat insulation and sound insulation effects.

Preferably, the heat-insulating member may be made of expanded polystyrene (EPS) foam, polyurethane (PU) foam, or the like to fulfill an overall heat transmission efficiency between upper and lower floors in a building prescribed by the law.

Preferably, the panel may be injection molded by use of a polypropylene (PP) material. Since the system of the present invention is a supporting structure material rather than being a flooring and thus, is not seen from the outside after being completely constructed, it is preferable to use the PP material having a high price competitiveness. It will be appreciated by those skilled in the art that, even when using the PP material instead of engineering plastic having relatively superior physical properties, the panel can be designed to sufficiently endure the daily life load.

Preferably, the concavo-convex portion of the panel may comprise protrusions and recesses having a width equal to or different from one another, and the concavo-convex portion of the heat-insulating member may comprise protrusions and recesses corresponding to the concavo-convex portion of the panel.

In consideration of easy manufacture and construction, the protrusions included in the concavo-convex portion of the heat-insulating member may be equidistantly arranged and have a square pillar shape, and the recesses included in the concavo-convex portion of the panel may have a square indentation shape.

Preferably, the concavo-convex portion of the panel may be formed below the pipe grooves to be spaced apart form the pipe grooves, so as not to cause interference between the recesses of the concavo-convex portion and the pipe grooves.

Preferably, the pipe grooves include first pipe grooves equidistantly formed at the upper surface of the panel along a first direction and second pipe grooves equidistantly formed along a second direction orthogonal to the first direction.

Preferably, the prop members may be formed with screw bores, respectively, the panel may be formed with screw guide surface along a height direction thereof at positions corresponding to the screw bores, and the screw guide surfaces have an arched cross sectional shape in the height direction.

Preferably, horizontality regulators may be installed between the slab floor surface and the respective prop members, and each of the horizontality regulators may comprise a supporting bolt to be fastened into the screw bore of the associated prop member and the vibration-proof member coupled to one end of the supporting bolt to come into contact with the flab floor surface. Preferably, the supporting bolt is a stud bolt having a driver seating groove formed at an upper surface thereof, and the vibration-proof member may be made of vibration-proof rubber.

DESCRIPTION OF DRAWINGS

The above and other objects, features and other advantages of the present invention will be more clearly understood from the following detailed description taken in conjunction with the accompanying drawings, in which.

DESCRIPTION OF REFERENCE NUMERALS TO IMPORTANT PARTS OF THE DRAWINGS

| | |
|---|---|
| 100: slab floor surface | 110: heat-insulating member |
| 112: protrusion | 114: prop member |
| 116: screw bore | 120: panel |
| 122: recess | 124: first pipe groove |
| 126: second pipe groove | 128: screw guide surface |
| 130: supporting bolt | 132: seating groove |
| 134: vibration-proof member | 140: heating pipe |

Best Mode

Hereinafter, a preferred embodiment of the present invention will be described in detail with reference to the accompanying drawings. In the following description and the accompanying drawings, a variety of specific details are described and shown for a better understanding of the present invention. However, the description of the specific details has been made only for the purpose of exemplification, and those skilled in the art will appreciate that the present invention is not limited to the following description and the accompanying drawings. Also, a detailed description of known functions and configurations incorporated herein will be omitted when it may make the subject matter of the present invention rather unclear.

Figure 1:
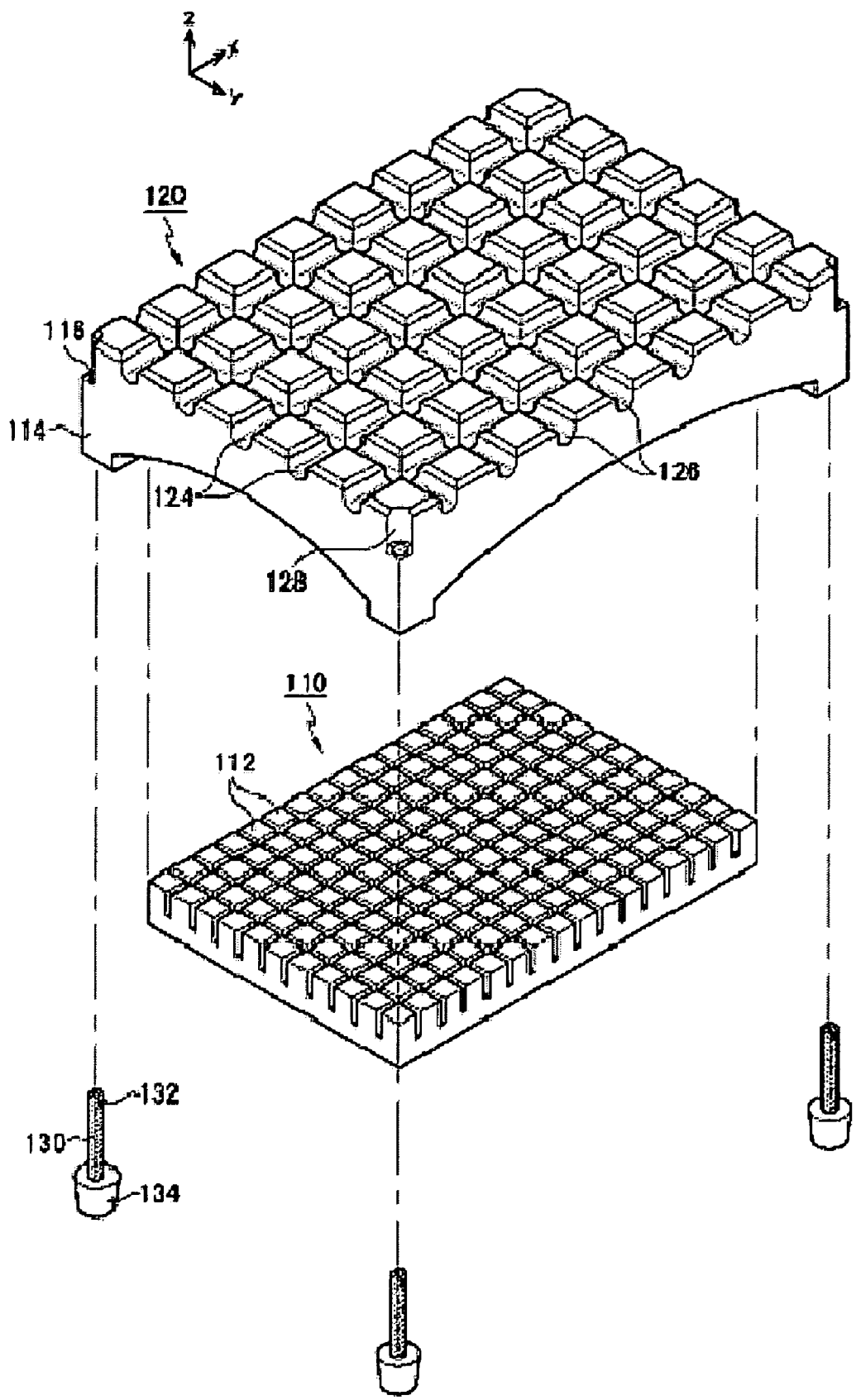
FIG. 1 is an exploded perspective view illustrating the configuration of a floor sound-insulating type heating system according to an embodiment of the present invention.
Figure 2:
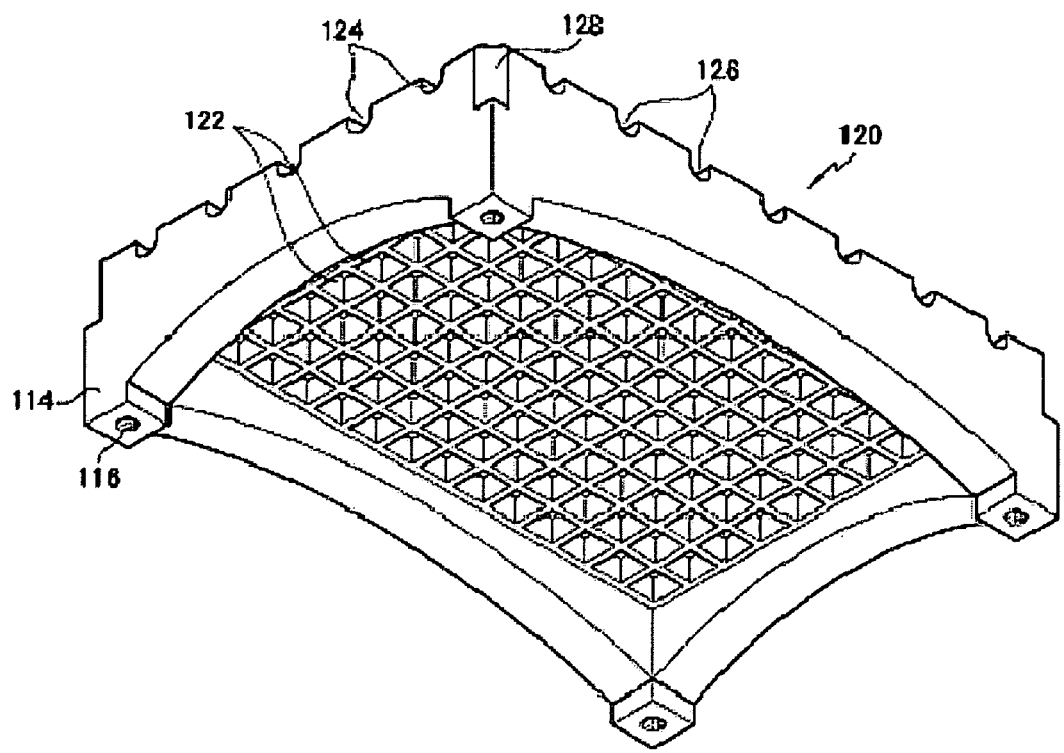
FIG. 2 is a perspective view illustrating the shape of a lower surface of a panel according to the embodiment of the present invention.
Figure 3:
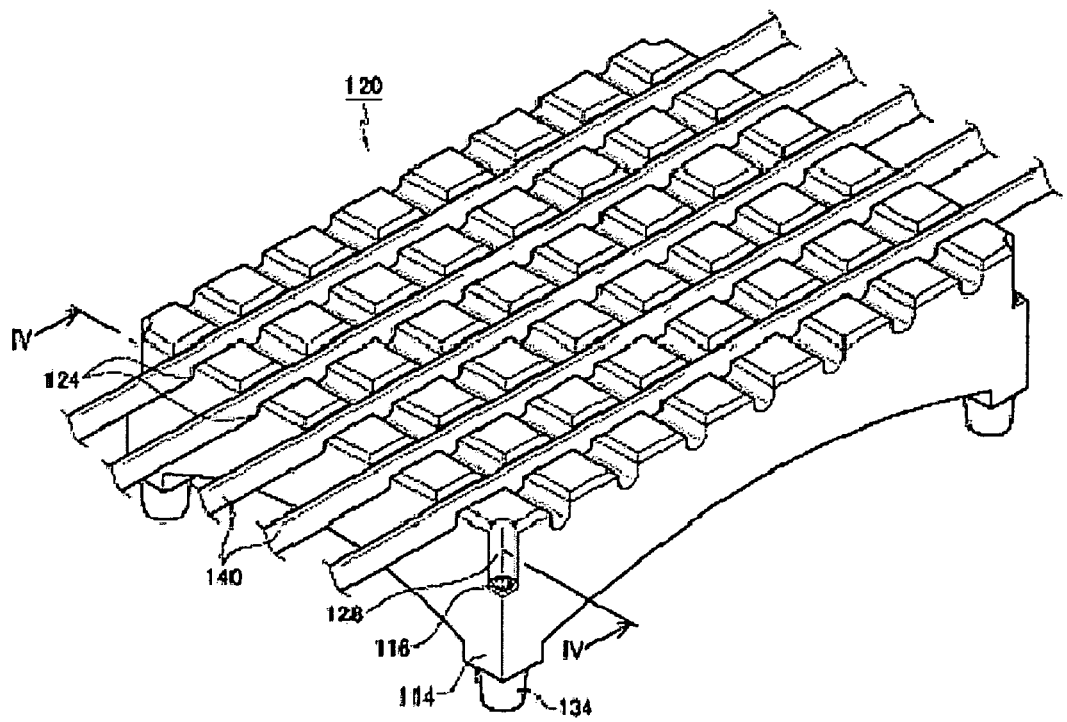
FIG. 3 is a perspective view illustrating the assembled configuration of the floor sound-insulating type heating system according to the embodiment of the present invention.
Figure 4:
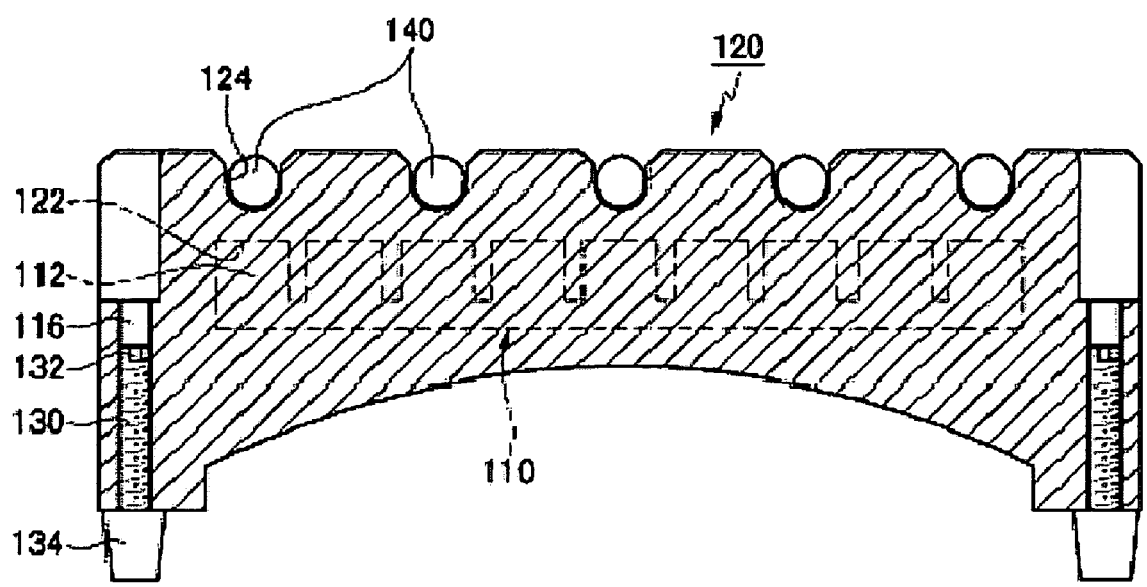
FIG. 4 is a sectional view taken along the line IV-IV of FIG. 3.

FIG. 1 is an exploded perspective view illustrating the configuration of a floor sound-insulating type heating system according to an embodiment of the present invention. FIG. 2 is a perspective view illustrating the shape of a lower surface of a panel according to the embodiment of the present invention. FIG. 3 is a perspective view illustrating the assembled configuration of the floor sound-insulating type heating system according to the embodiment of the present invention. FIG. 4 is a sectional view taken along the line IV-IV of FIG. 3.

Now, the configuration of a floor sound-insulating type heating system according to the embodiment of the present invention will be explained with reference to FIGS. 1 to 4.

In the embodiment of the present invention, the floor sound-insulating type heating system configured to be installed on a slab floor surface comprises a heat-insulating member 110 and a panel 120.

The heat-insulating member 110, as shown in FIG. 1, has a concavo-convex portion formed at an upper surface thereof, the concavo-convex portion including a plurality of protrusions 112. The protrusions 112 of the concavo-convex portion may be equidistantly arranged to have a lattice form, in consideration of ease manufacture and assembling of the heat-insulating member 110. The protrusions 112 of the concavo-convex portion may have a variety of shapes, and for example, may have a square pillar shape as shown in FIG. 1. The heat-insulating member 110 may be made of expanded polystyrene (EPS) foam, polyurethane (PU) foam, or the like.

The panel 120, as shown in FIG. 2, has a concavo-convex portion formed at a lower surface thereof, the concavo-convex portion including a plurality of recesses 122. The protrusions 112 of the heat-insulating member 110 are inserted into the recesses 122, to achieve a concavo-convex coupling structure. The panel 120, as shown in FIG. 1, also has U-shaped pipe grooves formed at an upper surface thereof for the arrangement of heating pipes 140. In the majority of the lower surface of the panel 120 except for corner portions, the recesses 122 of the concavo-convex portion formed at the lower surface of the panel 120 are positioned to correspond to the protrusions 112 of the concavo-convex portion formed at the upper surface of the heat-insulating member 110. The recesses 122 of the concavo-convex portion formed at the lower surface of the panel 120 are preferably shaped to allow the insertion of the protrusions 112 of the concavo-convex portion formed at the heat-insulating member 110. In the embodiment of the present invention, as shown in FIG. 2, it is preferable that the recesses 122 have a square indentation shape to correspond to the square pillar shape of the protrusions 112 of the concavo-convex portion formed at the heat-insulating member 110.

Preferably, the corner portions of the panel 120 are provided with prop members 114 extending downward from the lower surface of the panel 120, respectively. Thereby, the panel 120 is adapted to come into contact, at regions of the prop members 114, with the slab floor surface. This has the effect of increasing sound-insulation effect by virtue of a reduced contact area. Each prop member 114 is drilled with a screw bore 116 penetrating from the bottom to the top.

The concavo-convex portion of the panel is preferably formed below the pipe grooves to be spaced apart from the pipe grooves, in order to prevent interference between the recesses and the pipe grooves. Here, the recesses 122 of the concavo-convex portion formed at the panel may have a depth equal to or different from that of the pipe grooves. For example, the depth of the recesses 122 of the concavo-convex portion may be deeper than that of the pipe grooves. In this case, specifically, the recesses 122 and pipe grooves may have the same depth as each other at portions where the bottom of the recesses 122 and the bottom of the pipe grooves are adjacent to each other, whereas the depth of the recesses 122 may be deeper than that of the pipe grooves at the remaining portions where the bottom of the recesses 122 and the bottom of the pipe grooves are not adjacent to each other (i.e. peripheral portions of the pipe grooves). In conclusion, it is preferable that the recesses 122 and pipe grooves be configured to eliminate the risk of interference due to their depths.

The pipe grooves include first pipe grooves 124 equidistantly formed at the upper surface of the panel 120 along a first direction (x-axis direction of FIG. 1), and second pipe grooves 126 equidistantly formed at the upper surface of the panel 120 along a second direction (y-axis direction of FIG. 1) orthogonal to the first direction.

The corner portions of the panel 120 are also provided, at positions corresponding to the screw bores 116 of the prop members 114, with screw guide surfaces 128 extending along a height direction of the panel 120 (z-axis direction of FIG. 1), respectively. The screw guide surfaces 128 have an arched cross sectional shape in the height direction. The panel 120 may be injection molded by use of a polypropylene material.

The floor sound-insulating type heating system of the present invention may further comprise horizontality regulators arranged between the slab floor surface and the respective prop members 114. Each of the horizontality regulators preferably includes a supporting bolt 130 to be fastened into the associated screw bore 116, and a vibration-proof member 134 coupled to one end of the supporting bolt 130 to come into contact with the slab floor surface. Preferably, the supporting bolt 130 is a stud bolt having a screwdriver seating groove 132 (for example, linear or cross groove) formed at an upper surface thereof, and the vibration-proof member 134 is made of vibration-proof rubber.

As shown in FIG. 4, preferably, the heat-insulating member 110 is inserted underneath the panel 120, and a space is defined between the heat-insulating member 110 and the slab floor surface 100. The space provides a double floor structure advantageous to reduce a floor impact sound.

The above described floor sound-insulating type heating system according to the present invention provides a floor structure for reducing the transmission of an impact sound from upstairs to downstairs in an apartment complex, and the prop members 114 serving as supporting members are integrally coupled to the heating panel 120 serving as a heating member. Accordingly, it can be said that the heating system of the present invention is a floor heating system to replace a conventional wet under-floor heating system. That is, the present invention has a feature in that a floor sound-insulating system and dry floor heating system can be injection molded to have a single structure, and can be constructed together, to prevent problems of an excessive increase in the thickness of the entire floor heating system and reduced floor-to-floor spans caused when the floor sound-insulating system is constructed separately from the dry floor heating system.

Figure 5:
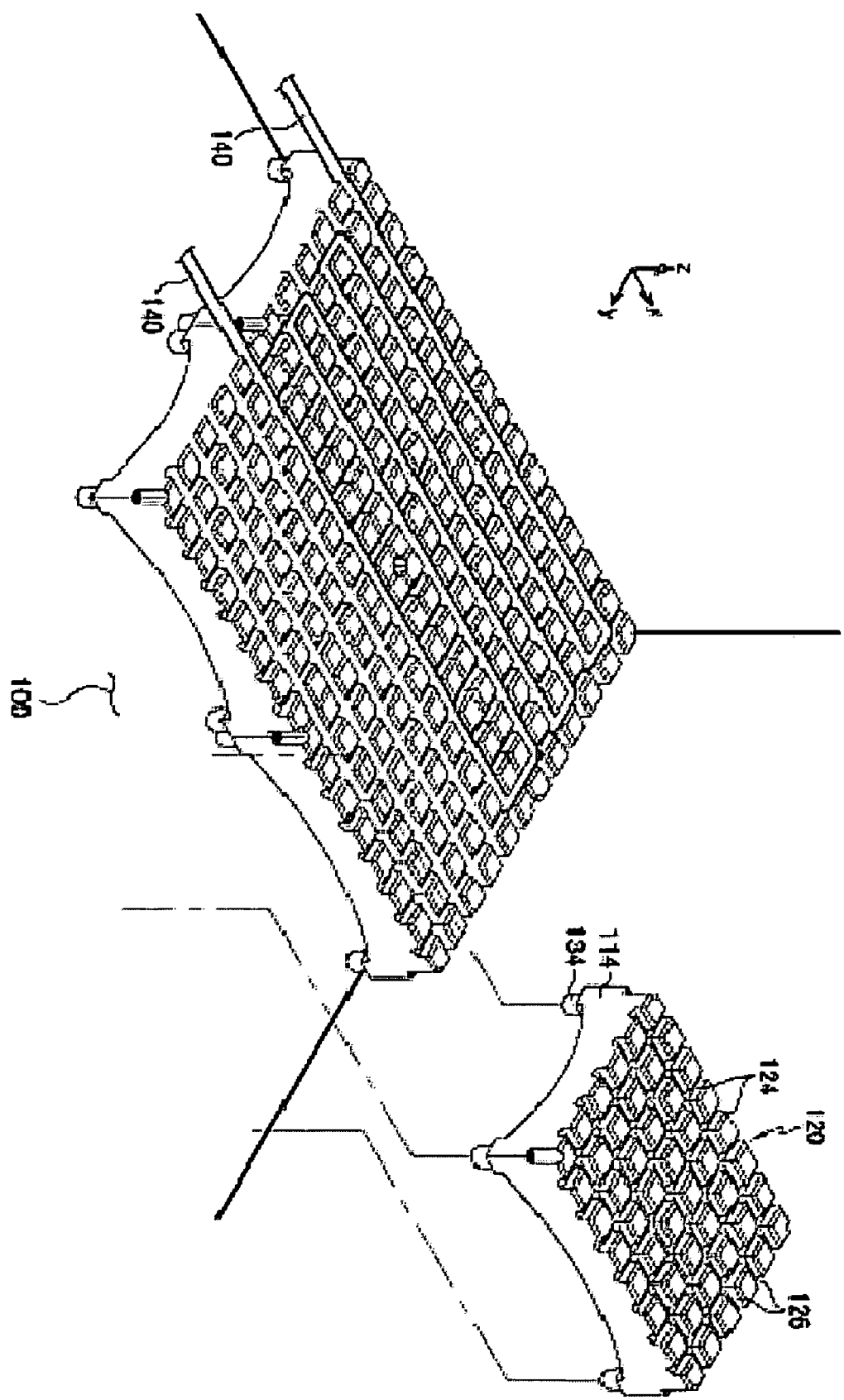
FIG. 5 is a perspective view illustrating the construction state of the floor sound-insulating type heating system according to the embodiment of the present invention.

FIG. 5 is a perspective view illustrating the construction state of the floor sound-insulating type heating system according to the present invention.

Now, the installation procedure of the floor sound-insulating type heating system according to the present invention will be explained with reference to FIGS. 1 to 5, on the basis of a general dry construction method.

To construct a floor surface of a building, preferably, the slab floor surface 100 is subjected to a floor surface preparation process for finishing irregularities on the slab floor surface so as to level the slab floor surface, and cleaning the slab floor surface to remove impurities.

With the floor surface preparation process, the panel 120 can be easily kept in a leveled state when being installed on the slab floor surface 100.

After the heat-insulating member 110 is inserted underneath the panel 120, the panel 120 is installed on the slab floor surface 100.

Although it is assumed that the slab floor surface 100 is leveled, it is preferable to regulate the installation state of the panel 120 by use of the horizontality regulators to keep the panel 120 in a more stable and rigid state. Since each horizontality regulator is a combination of the supporting bolt 130 and vibration-proof member 134 to evenly level the slab floor surface of the building, a distance between the prop members 114 of the panel 120 and the slab floor surface 100 can be regulated by rotating the supporting bolt 130 by use of a screwdriver having a shape corresponding to the seating groove 132 of the bolt 130.

Meanwhile, a thermo-material, such as silver foil containing ethylene, may be installed between the slab floor surface 100 and the panel 120, for the purpose of heat insulation and sound/vibration absorption.

Although the heat-insulating member 110 and panel 120 may be assembled directly at the construction site as stated above, it is preferable to integrally assemble the heat-insulating member 110 and panel 120 in the manufacture thereof, and to construct the assembled heat-insulating member 110 and panel 120 at the construction site. By virtue of the coupling structure of the protrusions 112 of the concavo-convex portion formed at the heat-insulating member 110 and the recesses 122 of the concavo-convex portion formed at the panel 120, the assembled heat-insulating member 110 and panel 120 have the effects of heat insulation and sound insulation.

The pipe grooves formed at the upper surface of the panel 120 have a U-shaped section. The U-shaped pipe grooves are preferably formed throughout the upper surface of the panel 120 in such a manner that the upper surface has protruding portions uniformly arranged to have a predetermined height and distance therebetween for guiding an advance direction of the heating pipes 140 when the heating pipes 140 are partially fitted into the pipe grooves.

An upper finishing material is installed on the panel 120. The upper finishing material may include a substrate layer made of a soundproof and impact-absorbing material, such as a compressed fibrous material, and a heat accumulating material, such as an inorganic filler, stacked on and bonded to the substrate layer. In the formation of the upper finishing material, the substrate layer and heat-accumulating layer may be compressed by use of an appropriate adhesive as needed. In the embodiment of the present invention, the configuration of the upper finishing material will not be described.

If the floor sound-insulating type floor heating system having the above described configuration according to the present invention is completed, a general monoleum, wood flooring, or the like is laid on the upper finishing material to finish the heating system.

With the above described configuration of the present invention, the protrusions 112 of the concavo-convex portion formed at the heat-insulating member 110 are engaged with the recesses 122 of the concavo-convex portion formed at the panel 120, resulting in an improvement in heat insulation and sound insulation effects. Further, as a result of providing the horizontality regulators between the panel 120 and the slab floor surface 100, it is possible not only to maintain a constant horizontality despite the presence of irregularities on the slab floor surface, but also to increase sound-insulation efficiency by vibration-proof operation of a contact surface. Specifically, even when the slab floor surface 100 is in a somewhat uneven state, the construction of the floor sound-insulating type heating system according to the present invention has the effect of preventing upstairs impact sound from being transmitted downstairs by virtue of the prop members 114 of the panel 120, thus resulting in an improvement in pleasantness.

INDUSTRIAL APPLICABILITY

As apparent from the above description, the present invention provides a floor sound-insulating type heating system having the effects of guaranteeing easy construction of both sound-insulating and heating structures, simplifying the entire construction procedure, and reducing the construction costs.

Further, according to the present invention, it is possible to reduce the entire time required to construct the sound-insulating and heating structures, and to achieve an increase in productivity by virtue of convenience and efficient working procedures.

Furthermore, through the use of horizontality regulators, the present invention has the effect of easily regulating the horizontality between a slab floor surface and constituent elements of the sound-insulating floor heating system. This has the effect of reducing the transmission of floor noise from upstairs to downstairs in a building.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A floor sound-insulating type heating system comprising:
    a panel installed on a slab floor surface and having a concavo-convex portion formed at a lower surface thereof and pipe grooves formed at an upper surface thereof to receive heating pipes; and
    a heat-insulating member having a concavo-convex portion formed at an upper surface thereof to be coupled to the concavo-convex portion formed at the lower surface of the panel,
    wherein the concavo-convex portion of the panel is formed below the pipe grooves to be spaced apart from the pipe grooves; and
    wherein the panel comprises prop members formed at corner portions thereof to extend downward from the lower surface thereof, a screw bore being formed in the respective prop members, and horizontality regulators are installed in the prop members, each of the horizontality regulators comprising a supporting bolt to be fastened into the screw bore, and a vibration-proof member coupled to one end of the supporting bolt to come into contact with the slab floor surface.

2. The system according to claim 1, wherein the heat-insulating member is inserted underneath the panel, and a space is defined between the heat-insulating member and the slab floor surface.

3. The system according to claim 2, wherein a thermo-material is mounted in the space.

4. The system according to claim 1, wherein the heat-insulating member is made of expanded polystyrene (EPS) or polyurethane (PU) foam.

5. The system according to claim 1, wherein the panel is injection molded by using polypropylene material.

6. The system according to claim 1, wherein the concavo-convex portion of the panel comprises protrusions and recesses having a width equal to or different from one another, and the concavo-convex portion of the heat-insulating member comprises protrusions and recesses corresponding to the concavo-convex portion of the panel.

7. The system according to claim 6, wherein the protrusions of the concavo-convex portion formed at the heat-insulating member are equidistantly arranged.

8. The system according to claim 6, wherein the protrusions of the concavo-convex portion formed at the heat-insulating member have a square pillar shape, and the recesses of the concavo-convex portion formed at the panel have a square indentation shape.

9. The system according to claim 1, wherein the pipe grooves include first pipe grooves equidistantly formed at the upper surface of the panel along a first direction and second pipe grooves equidistantly formed along a second direction orthogonal to the first direction.

10. The system according to claim 1, wherein the panel comprises screw guide surfaces along a height direction thereof at positions corresponding to the screw bores.

11. The system according to claim 10, wherein the screw guide surfaces have an arched cross sectional shape in the height direction.

12. The system according to claim 1, wherein the supporting bolt is a stud bolt having a screwdriver seating groove formed at an upper surface thereof.

13. The system according to claim 1, wherein the vibration-proof member is made of vibration-proof rubber.

* * * * *